May 4, 1965 J. W. RICHARDS 3,181,884
VEHICLE SUSPENSION SYSTEM HAVING TORSION BAR SPRING
Filed Aug. 10. 1961 2 Sheets-Sheet 1
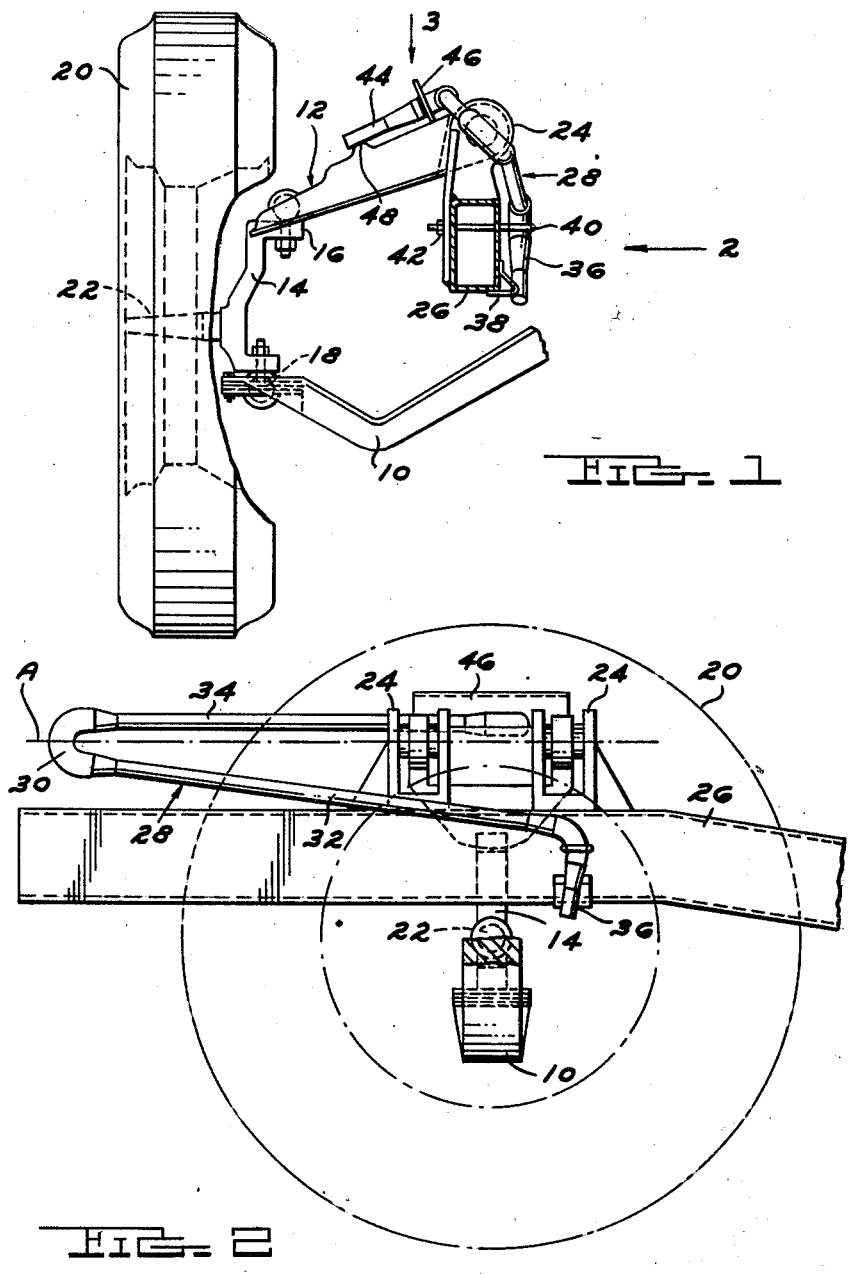
JESSE W. RICHARDS
INVENTOR.
BY John R. Faulkner
Clifford F. Sadler
ATTORNEYS

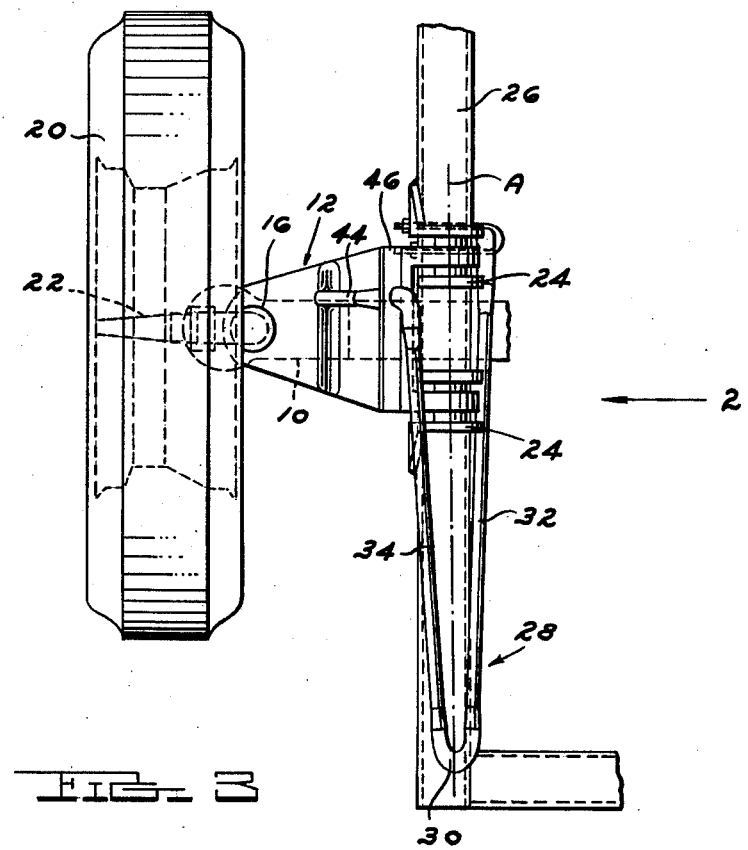

United States Patent Office 3,181,884
Patented May 4, 1965

3,181,884
VEHICLE SUSPENSION SYSTEM HAVING TORSION BAR SPRING
Jesse W. Richards, Dearborn, Mich., assignor to Ford Motor Company, Dearborn, Mich., a corporation of Delaware
Filed Aug. 10, 1961, Ser. No. 130,584
8 Claims. (Cl. 280—124)

This invention disclosure relates generally to motor vehicle suspensions and more particularly to suspensions employing torsion bar springs.

Certain well-known advantages accompany the use of torsion bar springs in vehicle suspension systems, however, their use may also present engineering design complications. For an example, to provide a motor vehicle with an appropriate spring rate a torsion bar is usually of rather long dimension and space must be allowed for such length. Care must also be used in designing the attachment of the torsion bar ends to the sprung and unsprung suspension components.

An object of this invention is to provide a vehicle suspension utilizing a torsion bar in which a bar having a sufficiently long length to achieve the desired ride characteristics can be employed yet in which the torsion bar can be installed in a relatively short linear space. Another object of this invention is to provide a suspension of this type in which the torsion bar can be installed closely adjacent a vehicle frame member and a wheel suspension arm so that it may be compactly arranged in such a position as to cause a minimum of interference with other vehicle components and to permit flexibility of vehicle design without departing from conventional arrangements.

More specifically it is an object of this invention to provide in its presently preferred embodiment, a laterally extending suspension arm that is pivotally supported upon an upstanding frame bracket. A V-shaped torsion bar is positioned to straddle the arm pivot with its ends secured to the arm and to the vehicle frame. The pivot axis for the arm is designed to bisect the acute angle formed by the legs of the V-shaped torsion bar. This provides a compact construction that may be accommodated by conventional automotive body design. Further, because the pivot axis of the arm bisects the torsion bar, the bar's major bend will not gyrate excessively upon jounce and rebound arm movement.

These and other objects and advantages of this invention will be readily apparent as the description proceeds and particularly when considered in connection with the accompanying drawings in which:

FIGURE 1 is a front elevational view of a motor vehicle suspension incorporating the presently preferred embodiment of this invention;

FIGURE 2 is a side elevational view of the suspension construction of FIGURE 1; and, FIGURE 3 is a top plan view of the suspension construction of FIGURE 1.

Referring now to the drawings for a more detailed understanding of this invention, an independent suspension system incorporating the presently preferred embodiment is shown. The suspension system includes a lower support arm 10 and an upper support arm 12. The outer ends of the arms 10 and 12 are connected to a wheel spindle 14 by an upper ball joint assembly 16 and a lower ball joint assembly 18. A road wheel and tire combination 20 is rotatably mounted on the stub shaft 22 of the spindle 14. The inner ends of the suspension arms 10 and 12 are pivotally connected to sprung vehicle body components to accommodate jounce and rebound deflection of the road wheel 20.

The inner end of the suspension arm 12 is pivotally connected to an upstanding bracket 24 which in turn is welded to a box-shaped frame member 26.

The vehicle body and other sprung members are resiliently supported on the unsprung suspension components by a V-shaped torsion bar 28 which is operatively interposed between the box-shaped frame member 26 and the upper support arm 12.

The torsion bar 28 is of generally V-shape and has an enlarged major bend 30 with diverging legs 32 and 34 extending therefrom. The end of inboard leg 32 terminates in a right-angle portion 36. As seen in FIGURE 1, the end 36 is provided with a groove or notch into which a rib-like bracket 38 is fitted. A U-bolt 40 surrounds the end 36 of the bar and has its leg portions extending through the frame 26. Nuts 42 are provided on the ends of the U-bolt 40 protruding from the exterior side of the frame 26. These nuts 42 are tightened to preload the torsion bar 28.

Outboard leg portion 34 of the bar 28 also terminates in a right-angled end portion and is identified by the reference numeral 44. The arm 12 has a sheet metal piece or flange 46 standing out from the plane of the arm 12 and having an opening through the which the end 44 passes. A rib 48 is provided in the arm 12 which complements a groove in the tip 44. This construction retains the end of the leg 34.

The foregoing construction provides a V-angled torsion bar interposed between the frame 26 and the arm 12 to resiliently support the sprung portion of the vehicle upon the road wheel 20.

By providing the V-shaped torsion bar 28 with diverging legs 32 and 34 an arrangement is permitted whereby the legs 32, 34 overlap the pivot bracket 24 for the suspension arm 12. This permits a highly compact construction. It will also be noted from FIGURES 1 and 3 that the pivot axis A of the pivotal connection between arm 12 and the pivot bracket 24 very nearly bisects the acute angle formed by the legs 32 and 34.

A V-shaped torsion bar as described above, and its relationship with respect to the arm 12, frame 26, pivot bracket 24 and pivot axis A permits a wheel suspension system of compact simplified design. The bend 30 will gyrate through a very small angle because of the relationship between the pivot axis A and major bend 30, upon oscillation of the arm 12 in response to jounce and rebound wheel movement. Additional advantages include the ability to preload the torsion bar to obtain the proper vehicle ride height at a convenient location exterior of the frame 26 through adjustment of the nut 42.

The foregoing description constitutes the presently preferred embodiment of this invention. Alterations and modifications may occur to those skilled in the art which will come within the scope and spirit of the following claims.

I claim:

1. In a vehicle suspension system having sprung and unsprung suspension components, an upstanding frame bracket connected to said sprung component, a pivotally mounted suspension arm connected to said frame bracket, a torsion bar with diverging legs straddling said pivotal connection, the pivot axis of said pivotal connection bisecting the angle between the legs of said torsion bar, said torsion bar being connected to said suspension arm and to said sprung components.

2. A suspension system for a motor vehicle having sprung and unsprung suspension parts, a frame member having a pivot bracket extending therefrom, a suspension arm pivotally connected to said bracket, a V-shaped torsion bar spring connected to said frame member and to said suspension arm, the legs of said V-shaped spring being set at an acute angle to each other and overlapping the pivotal connection of said suspension arm with said bracket, the pivot axis of said bracket bisecting the acute angle of the intersection between the legs of said torsion bar.

3. A vehicle suspension system having sprung and unsprung components, a suspension arm pivotally connected to said sprung component, a torsion spring interposed between said suspension arm and said sprung components, said torsion spring having a generally V-shape with diverging legs, the end portion of one of said legs being secured to the inner side of said sprung component, an outwardly extending threaded device securing said torsion bar end in position, the pivot axis of said pivotal connection nearly bisecting the angle between said torsion bar legs.

4. A vehicle suspension having sprung and unsprung components, an upstanding frame pivot bracket secured to said sprung component, a suspension arm pivotally connected to said bracket, a torsion spring interposed between said suspension arm and said sprung components, said spring having a generally V-shape with diverging legs that straddle said pivot bracket, the end portion of one of said legs being secured to the inner side of said sprung component, an outwardly extending threaded device securing said one leg in position, the pivot axis of said pivotal connection nearly bisecting the angle between said legs.

5. In a vehicle suspension system having sprung and unsprung suspension components, an upstanding frame bracket connected to said sprung component, a pivotally mounted suspension arm connected to said frame bracket and extending laterally therefrom, a torsion bar spring having a pair of diverging legs lying in a common plane, one of said legs being disposed on one side of said frame bracket and the other of said legs being disposed on the other side of said frame bracket when viewed from a point along a line perpendicular to said plane and between said legs, said one leg being connected to said suspension arm and the other leg being connected to said sprung components.

6. A suspension system for a vehicle having a longitudinally extending frame member, a road wheel and a suspension arm interconnecting said frame member and said wheel, said arm extending laterally outwardly from said frame member, a torsion bar spring interconnecting said arm and said frame member, said frame member having sides facing laterally inwardly and outwardly, said torsion bar spring having a generally V-shape with diverging legs, a threaded device extending through said frame member and securing the end portion of one of said legs to the side of said frame member facing laterally inwardly, said device having a tool engageable portion on the side of said frame member facing laterally outwardly, said tool engageable portion being actuatable to adjust the securing force exerted by said device which holds said end portion against said frame member, said suspension arm having a pivotal connection with said frame, said legs lying in a substantial common plane, one of said legs being disposed on one side of said pivotal connection and the other of said legs being disposed on the other side of said pivotal connection when viewed from a point along a line perpendicular to said common plane and between said legs.

7. A suspension system for a vehicle having a longitudinally extending frame member, a road wheel and a suspension arm interconnecting said frame member and said wheel, said arm extending laterally outwardly from said frame member, a torsion bar spring interconnecting said arm and said frame member, said frame member having sides facing laterally inwardly and outwardly, said torsion bar spring having a generally V-shape with diverging legs, a threaded device extending through said frame member and securing the end portion of one of said legs to the side of said frame member facing laterally inwardly, said device having a tool engageable portion on the side of said frame member facing laterally outwardly, said tool engageable portion being actuatable to adjust the securing force exerted by said device which holds said end portion against said frame member, said suspension arm having a pivotal connection with said frame, said torsion bar legs being arranged to straddle said pivotal connection with the axis of said pivotal connection substantially bisecting the angle between said legs.

8. In a vehicle suspension system having sprung and unsprung suspension components, an upstanding frame bracket connected to said sprung component, a suspension arm connected to said frame bracket and constructed to pivot about an axis, said arm extending laterally from said bracket, a torsion bar spring having a pair of diverging legs lying in a common plane, the axis of said torsion bar legs and the pivot axis of said arm comprising elements of a cone, one of said axes comprising the axis of revolution of said cone.

References Cited by the Examiner
UNITED STATES PATENTS

| | | | |
|---|---|---|---|
| 2,112,133 | 3/38 | Best | 280—124 X |
| 2,794,632 | 6/57 | Schilberg | 280—124 X |
| 2,839,293 | 6/58 | Cover | 267—57 |
| 2,858,142 | 10/58 | Schjolin | 280—124 |
| 3,029,091 | 4/62 | Allison | 280—124 |

A. HARRY LEVY, *Primary Examiner.*

LEO FRIAGLIA, *Examiner.*